(12) United States Patent
Monica et al.

(10) Patent No.: US 12,401,518 B2
(45) Date of Patent: *Aug. 26, 2025

(54) CRYPTOASSET CUSTODIAL SYSTEM WITH DIFFERENT RULES GOVERNING ACCESS TO LOGICALLY SEPARATED CRYPTOASSETS

(71) Applicant: Anchor Labs, Inc., San Francisco, CA (US)

(72) Inventors: Diogo Monica, San Francisco, CA (US); Nathan P. McCauley, San Francisco, CA (US); Boaz Avital, San Francisco, CA (US); Riyaz D. Faizullabhoy, Los Altos, CA (US)

(73) Assignee: Anchor Labs, Inc., San Francisco, CA (US)

( * ) Notice: Subject to any disclaimer, the term of this patent is extended or adjusted under 35 U.S.C. 154(b) by 1159 days.

This patent is subject to a terminal disclaimer.

(21) Appl. No.: 16/255,666

(22) Filed: Jan. 23, 2019

(65) Prior Publication Data

US 2019/0268165 A1 Aug. 29, 2019

Related U.S. Application Data

(63) Continuation-in-part of application No. 16/011,529, filed on Jun. 18, 2018.
(Continued)

(51) Int. Cl.
*H04L 9/32* (2006.01)
*G06F 21/60* (2013.01)
(Continued)

(52) U.S. Cl.
CPC .......... *H04L 9/3247* (2013.01); *G06F 21/602* (2013.01); *G06F 21/604* (2013.01);
(Continued)

(58) Field of Classification Search
CPC ... H04L 9/3247; H04L 9/0637; H04L 9/0877; H04L 9/0894; H04L 9/30; H04L 9/3236;
(Continued)

(56) References Cited

U.S. PATENT DOCUMENTS 6,950,523 B1 9/2005 Brickell et al.
9,892,460 B1 2/2018 Winklevoss et al.
(Continued)

FOREIGN PATENT DOCUMENTS

CN 107533501 A 1/2018

OTHER PUBLICATIONS

Anonymous: "Hierarchical Deterministic: Wallets—BIP32", Feb. 2017, Retrieved from the Internet: URL:https://github.com/bitcoin/bips/blob/11b0fa37bee4eac40c3albe059107868$bcc3392/bip-0032.mediawiki [retrieved on Jun. 20, 2018], 9 pages.
(Continued)

*Primary Examiner* — John W Hayes
*Assistant Examiner* — Taylor S Rak
(74) *Attorney, Agent, or Firm* — Bookoff McAndrews PLLC

(57) ABSTRACT

Methods, systems, and apparatus, including medium-encoded computer program products, for secure storage and retrieval of information, such as private keys, useable to control access to a blockchain, include, in at least one aspect, a method including: receiving a request to take an action with respect to a vault of multiple different vaults in a cryptoasset custodial system; authenticating, by an HSM, the policy map for the vault based on a cryptographic key controlled by the HSM; checking, by the HSM, the action against the policy map for the vault when the policy map for the vault is authenticated based on the cryptographic key
(Continued)

controlled by the HSM; and effecting, by the HSM, the action when the action is confirmed to be in accordance with the policy map for the vault.

9 Claims, 10 Drawing Sheets

Related U.S. Application Data

(60) Provisional application No. 62/640,429, filed on Mar. 8, 2018, provisional application No. 62/636,106, filed on Feb. 27, 2018.

(51) Int. Cl.
```
G06F 21/64      (2013.01)
G06F 21/72      (2013.01)
G06F 21/78      (2013.01)
G06Q 20/36      (2012.01)
H04L 9/00       (2022.01)
H04L 9/06       (2006.01)
H04L 9/08       (2006.01)
H04L 9/30       (2006.01)
H04L 9/40       (2022.01)
H04W 12/069     (2021.01)
```

(52) U.S. Cl.
CPC ............ *G06F 21/645* (2013.01); *G06F 21/72* (2013.01); *G06F 21/78* (2013.01); *G06Q 20/3674* (2013.01); *H04L 9/0637* (2013.01); *H04L 9/0877* (2013.01); *H04L 9/0894* (2013.01); *H04L 9/30* (2013.01); *H04L 9/3236* (2013.01); *H04L 63/10* (2013.01); *H04L 63/126* (2013.01); *H04W 12/069* (2021.01); *H04L 9/50* (2022.05); *H04L 2209/12* (2013.01); *H04L 2209/56* (2013.01)

(58) Field of Classification Search
CPC ......... H04L 63/10; H04L 63/126; H04L 9/50; H04L 2209/12; H04L 2209/56; G06F 21/602; G06F 21/604; G06F 21/645; G06F 21/72; G06F 21/78; G06Q 20/3674; H04W 12/069
See application file for complete search history.

(56) References Cited

U.S. PATENT DOCUMENTS

| | | | |
|---|---|---|---|
| 9,916,581 | B2 | 3/2018 | Dorsey et al. |
| 9,935,937 | B1* | 4/2018 | Potlapally ............ H04L 63/0823 |
| 10,068,228 | B1 | 9/2018 | Winklevoss et al. |
| 10,373,158 | B1 | 8/2019 | James et al. |
| 10,439,811 | B2 | 10/2019 | Norton |
| 11,095,446 | B2* | 8/2021 | Monica .................. H04L 9/0897 |
| 2004/0128504 | A1 | 7/2004 | Kivinen |
| 2004/0236694 | A1 | 11/2004 | Tattan |
| 2005/0010758 | A1* | 1/2005 | Landrock .............. H04L 63/126 713/156 |
| 2005/0273442 | A1 | 12/2005 | Bennett |
| 2008/0031460 | A1 | 2/2008 | Brookner et al. |
| 2010/0024017 | A1 | 1/2010 | Ashfield et al. |
| 2010/0119061 | A1 | 5/2010 | Kawale |
| 2011/0154025 | A1 | 6/2011 | Spalka |
| 2012/0192260 | A1 | 7/2012 | Kontsevich |
| 2014/0040051 | A1 | 2/2014 | Ovick et al. |
| 2014/0046842 | A1 | 2/2014 | Irudayam |
| 2014/0156534 | A1 | 6/2014 | Quigley et al. |
| 2015/0170112 | A1 | 6/2015 | DeCastro |
| 2015/0287026 | A1 | 10/2015 | Yang et al. |
| 2015/0302397 | A1* | 10/2015 | Kalgi ................. G06Q 20/3829 705/65 |
| 2015/0363778 | A1 | 12/2015 | Ronca et al. |
| 2015/0373122 | A1 | 12/2015 | Steel et al. |
| 2016/0189134 | A1 | 6/2016 | Voege et al. |
| 2016/0283920 | A1 | 9/2016 | Fisher et al. |
| 2016/0285872 | A1 | 9/2016 | Polar |
| 2017/0006018 | A1 | 1/2017 | Campagna |
| 2017/0076518 | A1 | 3/2017 | Patterson et al. |
| 2017/0154331 | A1 | 6/2017 | Voorhees |
| 2017/0230375 | A1 | 8/2017 | Kurian |
| 2017/0237554 | A1* | 8/2017 | Jacobs ................ H04W 12/106 713/171 |
| 2017/0373849 | A1 | 12/2017 | Donner et al. |
| 2017/0374033 | A1 | 12/2017 | Kovacs |
| 2018/0082076 | A1* | 3/2018 | Murray .................. H04L 63/10 |
| 2018/0130158 | A1 | 5/2018 | Atkinson et al. |
| 2018/0181737 | A1 | 6/2018 | Tussy |
| 2018/0367311 | A1* | 12/2018 | Stahlberg .............. H04L 9/3234 |
| 2018/0367316 | A1 | 12/2018 | Cheng et al. |
| 2019/0007205 | A1* | 1/2019 | Corduan ............... H04L 63/062 |
| 2019/0043022 | A1 | 2/2019 | Fosmark et al. |
| 2019/0052456 | A1* | 2/2019 | Bygrave .............. G06F 21/6209 |
| 2019/0207915 | A1* | 7/2019 | Schaap ............... H04L 63/0442 |
| 2019/0236594 | A1 | 8/2019 | Ehrloch-Quinn et al. |
| 2019/0251524 | A1 | 8/2019 | Sadrizadeh et al. |
| 2019/0266576 | A1 | 8/2019 | McCauley et al. |
| 2019/0305956 | A1 | 10/2019 | Irani, III |
| 2019/0347666 | A1 | 11/2019 | Bermudez-Cisneros et al. |
| 2019/0356491 | A1 | 11/2019 | Herder, III et al. |
| 2019/0372779 | A1 | 12/2019 | Monica et al. |
| 2020/0167338 | A1 | 5/2020 | Brock et al. |
| 2020/0266997 | A1 | 8/2020 | Monica et al. |
| 2020/0380523 | A1 | 12/2020 | Agrawal et al. |
| 2021/0056548 | A1 | 2/2021 | Monica et al. |
| 2021/0073753 | A1* | 3/2021 | Shtylman ........... G06Q 20/3829 |

OTHER PUBLICATIONS

Anonymous: "How to properly secure cryptocurrencies exchanges—Ledger", Aug. 2016, Retrieved from the Internet: URL:https://www.ledger.fr/2016/08/08/hcpw-to-properly-secure-cryptocu rrenci es-exchanges/ [retrieved on Jun. 29, 2018], 4 pages.

International Search Report and Written Opinion in Application No. PCT/US2019/019425, dated May 9, 2019, 12 pages.

Response to US Office Action in U.S. Appl. No. 16/544,740, dated Jul. 31, 2020, 15 pages.

US Notice of Allowance in U.S. Appl. No. 16/544,740, dated Aug. 18, 2020, 12 pages.

Bonneau et al., "SoK: Research Perspectives and Challenges for Bitcoin and Cryptocurrencies," 2015 IEEE Symposium on Security and Privacy, May 17-21, 2015, San Jose, CA, USA, 104-121.

Liu et al., "Security Analysis of Electronic Payment Protocols Based on Quantum Cryptography," 2017 4th International Conference on Information Science and Control Engineering, Jul. 21-23, 2017, Changsha, China, 1709-1712.

US Office Action in U.S. Appl. No. 16/544,740, dated Jun. 2, 2020, 47 pages.

Cryptomathic.com [online], "Understanding Hardware Security Modules," Sep. 13, 2017, retrieved on Dec. 31, 2018, retrieved from: URL<https:www.cryptomathic.com/news-events/blog/understanding-hardware-security-modules-hsms>, 10 pages.

Wired.com [online], "Crypto anchors' might stop the next Equifax-style megabreach," Oct. 11, 2017, retrieved from: URLhttps://www.wired.com/story/crypto-anchors-breach-security/>, 11 pages.

PCT International Search Report and Written Opinion in International Appln. No. PCT/US2020/017411, dated Apr. 15, 2020, 19 pages.

International Search Report and Written Opinion in Application No. PCT/US2019/019414, dated May 15, 2019, 12 pages.

Monica, "Crypto Anchors: Exfiltration Resistant Infrastructure," 11 pages, dated Oct. 8, 2017.

Monica, "Increasing Attacker Cost Using Immutable Infrastructure," 8 pages, dated Nov. 19, 2016.

Monica, "The two metrics that matter for host security," 6 pages, dated Aug. 31, 2017.

(56) References Cited

OTHER PUBLICATIONS

Chinese Office Action with Search Report in corresponding Chinese Application No. 201980028214.0, dated Feb. 27, 2024 (13pages).
Chinese Office Action with supplementary search report issued in Chinese Application No. 201980028214.0, issued Nov. 18, 2024 (18 pages).

* cited by examiner

CRYPTOASSET CUSTODIAL SYSTEM WITH DIFFERENT RULES GOVERNING ACCESS TO LOGICALLY SEPARATED CRYPTOASSETS

CROSS-REFERENCE TO RELATED APPLICATIONS

This application is a continuation-in-part application of, and claims priority to, U.S. patent application Ser. No. 16/011,529, entitled Digital Asset Custodial System, which was filed on Jun. 18, 2018, which application claims the benefit of U.S. Patent Application No. 62/640,429, filed Mar. 8, 2018, and claims the benefit of U.S. Patent Application No. 62/636,106, filed Feb. 27, 2018.

BACKGROUND

Technical Field

This specification relates to computer-implemented systems and techniques for secure storage and retrieval of information, such as private keys, useable to control access to a blockchain.

Description of Related Art

A blockchain is a distributed ledger technology that enables multiple users to produce and share a verifiable record of every transaction made in a system that uses the blockchain. Blockchains can be public, private, or include both publicly and privately accessible portions. In any case, the blockchain is updated only by consensus among designated users of the system. Thus, a blockchain represents a consensus of replicated, shared, and synchronized digital data spread across multiple nodes, without a central administrator or centralized data storage. Replication and sharing, in addition to the use of cryptographic hashing techniques, give the blockchain-based distributed ledger its characteristic resiliency and protection against unauthorized alteration. However, the lack of a central administrator can also result in new risks when access keys for the blockchain are lost or stolen. This can be of particular concern when the blockchain includes large amounts of cryptographic assets, also referred to as cryptoassets, such as BITCOIN, ETHEREUM, and RIPPLE cryptocurrencies.

Such cryptocurrencies have gained in popularity and value in recent years and are expected by many to continue to do so. Every day an increasing variety of transactions are conducted based on cryptocurrencies, and it is conceivable that new types of cryptoassets may be created in the future, i.e., cryptoassets that are not necessarily currencies. With the increasing use of cryptoassets comes the need for a trusted custodial system that can securely store very large quantities of cryptoassets and control access to those cryptoassets. Indeed, U.S. securities regulations require certain entities that hold more than a certain amount of funds (e.g., $150 million) on behalf of another party to use a custodian to hold those funds. Hardware wallets and other forms of "cold storage" are sometimes used to store cryptocurrency, however, those devices limit access only to the owner of the device and are therefore not suitable for many business uses, where a number of individuals may require access to cryptocurrencies or other cryptoassets.

SUMMARY

This specification describes technologies relating to computer-implemented systems and techniques for secure storage and retrieval of information, such as private keys, useable to control access to a blockchain, where the systems and techniques include a logical separation of a user's private keys, which are useable to access at least one blockchain, and different rules governing use of the logically separated private keys. In the context of a cryptoasset custodial system, the technical security measures taken may be breached and cryptoassets can be stolen if an access control mechanism used by the system is compromised. To address such risks, cryptographic processing techniques can be used to restrict access to cryptoassets through logically separated access policy maps that are enforced using at least one cryptographic key controlled by a hardware security module. Using such systems and techniques improves security, and can reduce damage from a breach of security, in a cryptoasset custodial system. Granularity of access control to a key and keys derived from it can be increased, and funds stored in different vaults can be completely isolated from each other and be controlled by different policies. The use of different permission schemes on different vaults enables tradeoffs to be made between security and speed of access, e.g., a two out of three endorser quorum for a fast trading vault versus a seven out of ten endorser quorum for a long hold vault.

One or more aspects of the subject matter described in this specification can be embodied in one or more methods that include receiving a request to take an action with respect to a vault of multiple different vaults in a cryptoasset custodial system, wherein the multiple different vaults are logical groupings of cryptoassets associated with a user of the cryptoasset custodial system, and each of the multiple different vaults has an associated policy map that defines vault control rules governing which actions are allowed for the vault under one or more specified conditions; authenticating, by a hardware security module, the policy map for the vault on which the action is requested based on a cryptographic key controlled by the hardware security module, wherein the hardware security module includes at least one secure storage device and at least one physical computing device coupled with the at least one secure storage device, the at least one physical computing device being configured to provide cryptographic processing to manage, for the user, private keys of asymmetric cryptographic key pairs usable to control access to the cryptoassets in at least one blockchain; checking, by the hardware security module, the action against the policy map for the vault when the policy map for the vault is authenticated based on the cryptographic key controlled by the hardware security module; and effecting, by the hardware security module, the action when the action is confirmed to be in accordance with the policy map for the vault.

The cryptographic key can be a private key of an asymmetric cryptographic key pair used by the hardware security module, and authenticating the policy map can include using a public key of the asymmetric cryptographic key pair used by the hardware security module to validate a cryptographic digital signature of the policy map for the vault. Authenticating the policy map can include decrypting the policy map for the vault using the cryptographic key controlled by the hardware security module.

The vault control rules of the policy map for the vault can specify, for the action, individual users of the cryptoasset custodial system and a threshold number of the individual users to approve the action, and checking the action against the policy map for the vault can include: validating endorsement messages from at least a subset of the specified individual users of the cryptoasset custodial system; and confirming the action is in accordance with the vault control rules of the policy map when the endorsement messages have been validated for the threshold number of the specified individual users. Validating the returned messages can include checking cryptographic digital signatures using public keys corresponding to the subset of the specified individual users. The action can include changing the policy map for the vault, and effecting the action can include: processing an updated version of the policy map using the cryptographic key controlled by the hardware security module; and sending or saving results of the processing for future use by the hardware security module. Further, the cryptographic key can be a private key of an asymmetric cryptographic key pair, and processing the updated version of the policy map can include digitally signing, in the hardware security module, the updated version of the policy map using a private key of the asymmetric cryptographic key pair.

The logical groupings associated with the user of the cryptoasset custodial system can be enforced by deriving the private keys of the asymmetric cryptographic key pairs, which are usable to control access to the cryptoassets in the at least one blockchain, from respective unique identifiers of the multiple different vaults in the cryptoasset custodial system. Effecting the action can include: regenerating a private key for the one of the cryptoassets by applying a deterministic key derivation function to at least the unique identifier for the vault, an asset identifier for the one of the cryptoassets, and a cryptographic key associated with the user; digitally signing at least a portion of the request using the private key for the one of the cryptoassets; sending resulting digital signature data to the at least one blockchain; and deleting the private key for the one of the cryptoassets from memory in the hardware security module.

The one or more methods can be implemented using one or more computer-readable mediums encoding one or more computer programs operable to cause a hardware security module, including at least one secure storage device and at least one physical computing device coupled with the at least one secure storage device, to perform operations of the one or more methods.

One or more aspects of the subject matter described in this specification can be embodied in one or more systems that include: one or more hardware security modules, each of the one or more hardware security modules including at least one secure storage device and at least one physical computing device coupled with the at least one secure storage device and configured to provide cryptographic processing to manage private keys of asymmetric cryptographic key pairs usable to control access to cryptoassets in at least one blockchain, wherein the private keys are organized into logical groupings, and each of the logical groupings has an associated policy map that defines rules governing which actions are allowed for the logical grouping under one or more specified conditions; and one or more server computers communicatively coupled with the one or more hardware security modules to access the cryptographic processing performed by the at least one physical computing device using the private keys; wherein the at least one physical computing device of each of the one or more hardware security modules is configured to check a requested action against the policy map corresponding to the logical grouping with respect to which the action is requested after authenticating the policy map based on a cryptographic key controlled by the hardware security module, and effect the requested action when the action is confirmed to be in accordance with the policy map.

The at least one physical computing device of each of the one or more hardware security modules can be configured to authenticate the policy map by checking a digital signature of the policy map using a public key of an asymmetric cryptographic key pair. The rules of the policy map can specify, for the requested action, individual users of the system and a threshold number of the individual users to approve the requested action, and the at least one physical computing device of each of the one or more hardware security modules can be configured to check the requested action by validating endorsement messages from at least a subset of the specified individual users of the system, and confirming the requested action is in accordance with the rules of the policy map when the endorsement messages have been validated for the threshold number of the specified individual users. The requested action can include changing the policy map, and the at least one physical computing device of each of the one or more hardware security modules can be configured to effect the requested action by processing an updated version of the policy map using the cryptographic key controlled by the hardware security module, and sending or saving results of the processing for future use by the hardware security module.

The at least one physical computing device of each of the one or more hardware security modules can be configured to enforce the logical groupings by deriving the private keys of the asymmetric cryptographic key pairs from respective unique identifiers of the logical groupings. The at least one physical computing device of each of the one or more hardware security modules can be configured to effect the requested action by regenerating a private key by applying a deterministic key derivation function to at least the unique identifier for the associated logical grouping, an asset identifier, and a cryptographic key associated with a user, digitally signing at least a portion of provided data using the regenerated private key, sending resulting digital signature data to the at least one blockchain, and deleting the regenerated private key from memory in the hardware security module. Further, the one or more server computers can include: at least one online server computer configured to accept requests from a public computer network; and at least one relay server computer communicatively coupled between the at least one online server computer and the one or more hardware security modules.

BRIEF DESCRIPTION OF THE DRAWINGS

Various embodiments of the present disclosure are shown by way of example and not limitation in the figures of the accompanying drawings, in which like references indicate similar elements.

DETAILED DESCRIPTION

Figure 1A:
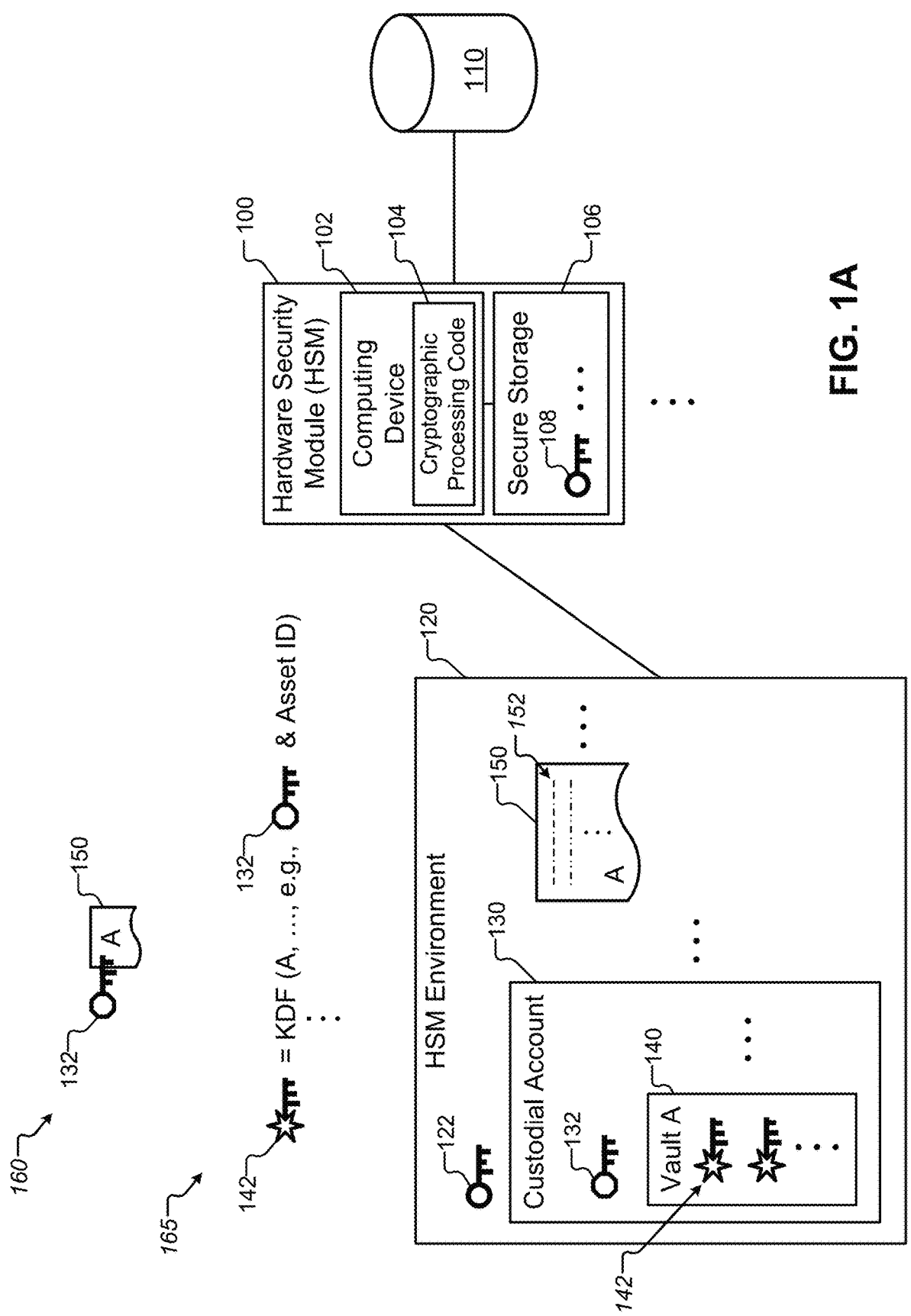
FIG. 1A is a schematic diagram showing an example of a structure of access rules enforced by a hardware security module (HSM).

In this description, references to "an embodiment", "one embodiment" or the like, mean that the particular feature, function, structure or characteristic being described is included in at least one embodiment of the systems and techniques being described. Occurrences of such phrases in this specification do not necessarily all refer to the same embodiment. On the other hand, the embodiments referred to also are not necessarily mutually exclusive.

Overview

Introduced here is a computer-implemented cryptoasset custodial system (CCS), i.e., a computer-implemented system for maintaining custody of, and controlling access to, cryptocurrencies and/or other cryptoassets. The CCS may be owned and/or operated by a business enterprise, referred to herein as the Cryptoasset Custodian, on behalf of one or more customers who may each have multiple users (employees or retail customers) of the CCS. The CCS includes logical groupings of cryptoassets (referred to as "vaults") to limit access to the private keys usable to control access to the cryptoassets in at least one blockchain, where the logical groupings are controlled by one or more hardware security modules.

As used herein, the term "hardware security module" or "HSM" refers to a special-purpose physical computing device that safeguards and manages digital keys for authentication and provides cryptoprocessing functionality. The HSM can be embodied as a plug-in card or an external device that attaches directly to a computer. Moreover, in certain embodiments, the CCS includes multiple layers of security so as to enable large volumes of cryptoassets to be maintained in a secure manner.

In certain embodiments, the CCS includes a combination of biometric-based multi-user validation, transaction risk analysis, and use of a hardware security module (HSM) to provide authentication/validation functionality and secure storage of private keys of cryptoassets. Furthermore, two or more different biometric authentication techniques may be applied to any given transaction request. In addition, in certain embodiments, when a user requests a transaction involving a cryptoasset, such as a withdrawal or transfer of cryptocurrency funds, the CCS causes an endorsement request message to be sent to each of multiple user devices, each of which is associated with a different user who has been defined as a potential member of a quorum for transactions involving that cryptoasset (in other embodiments, multiple users may share the same user device). The endorsement request message is configured to cause each receiving user device to prompt its user to provide an endorsement of the requested transaction. An endorsement in this context is an approval or rejection of an operation by a user. When a user receiving such a prompt endorses the transaction on his or her user device (e.g., a smartphone, tablet or notebook computer), the user device signs an endorsement message with a private key of that user and transmits the signed endorsement message to the CCS. The private key is stored within a secure enclave within the user device. A secure enclave in each user device is used to store the corresponding user's private key and to generate digital signatures of that user.

For any action with respect to a vault, the HSM determines whether the policy map for the vault is authentic, and if so, the HSM only allows the action when it conforms to the rules set forth in the authenticated policy map. In some embodiments, the HSM determines whether a policy-based quorum of multiple users has endorsed (approved) a requested action, such as a withdrawal or transfer of cryptocurrency funds. It does this by validating the signature by a public key of a public-private key pair for each of the plurality of users, in endorsement messages received from the users. After determining that the policy-based quorum of the multiple users has validly endorsed the requested action, the HSM then allows itself to access the private key of that particular cryptographic asset (e.g., for a specific deposit of cryptocurrency funds), which the HSM previously generated, and uses that private key to sign the transaction as authorization that the transaction may proceed. The private key for that cryptoasset is stored in (or otherwise controlled by) only the HSM, which does not permit the key to be obtained by any entity outside the HSM. Approval of the transaction may include, for example, transmitting the transaction onto a known blockchain network. In certain embodiments, approval of the transaction by the HSM occurs only if and after the requested transaction has passed a risk review, which may be partially or fully automated. Other details will become apparent from the description that follows. Note also that it is contemplated the system and techniques introduced here can be used for secure custody of other types of digital assets besides cryptoassets.

Vaults System for HSM

FIG. 1A is a schematic diagram showing an example of a structure of access rules enforced by an HSM 100. The HSM 100 includes at least one physical computing device 102, which executes cryptographic processing code 104 that manages private keys of asymmetric cryptographic key pairs usable to control access to cryptoassets in at least one blockchain. The HSM 100 also includes at least one secure storage device 106 coupled with the physical computing device 104. In some embodiments, the secure storage device 106 is coupled with the physical computing device 102 by being integrated therewith. For example, the secure storage device 106 can be a non-volatile memory device included in an integrated circuit chip including the physical computing device 102, and the cryptographic processing code 104 can be stored in (and potentially run directly from) the secure non-volatile memory device 106.

In some embodiments, the physical computing device(s) 102 and the secure storage device(s) 106 of the HSM 100 are implemented as a Secure Execution Environment (SEE), where the code 104 cannot be changed except through physical access to the HSM 100, and any change to the code 104 requires a set of smartcards held securely by multiple employees of the Cryptoasset Custodian. In some embodiments, a general signed code check is used to ensure the security of the cryptographic processing code 104. Further, in some embodiments, the HSM has access to a database 110. The database 110 can be included in the secure storage device(s) 106 or hosted on a separate computing system, such as a server computer coupled with the HSM 100 through a computer network.

The secure storage device 106 stores one or more cryptographic keys 108 that are controlled by the HSM 100. At a minimum, the HSM 100 can have a single master key 108 that never leaves the HSM 100. In such embodiments, the master key 108 is used to encrypt and decrypt all sensitive data (including other cryptographic keys) so that this data can be securely stored in the database 110 on another computer system, but this secured data cannot be decrypted except in the HSM 100 as the master key 108 stays within the HSM 100. The one or more cryptographic keys 108 can be one or more symmetric cryptographic keys and/or one or more asymmetric cryptographic key pairs, where each key pair has a public key and a private key, which are usable for digital signature processing. For example, the one or more cryptographic keys 108 can be a private key of a customer of the CCS and/or private cryptoasset keys that are logically separated into vaults.

In any case, the HSM 100 provides an HSM environment 120 in which cryptographic processing code 104 operates on multiple cryptographic keys to control access to cryptoassets that are managed by the CCS. The HSM 100 can provide cryptographic processing for one or more custodial accounts 130, each account 130 being for one or more customers of the Cryptoasset Custodian. Each account 130 includes two or more vaults 140, where each vault 140 includes multiple private keys 142 useable to access cryptoassets. In some embodiments, the private keys 142 are derived (at least in part) from a Vault ID for each respective vault 140, which helps to enforce the logical separation of the private keys in the respective vaults, thus improving security in the CCS. In addition, each vault 140 has its own associated policy map 150, which defines vault control rules 152 governing which actions are allowed for the vault 140 under one or more specified conditions. The rules 152 of each policy map 150 can include quorum requirements, as described further below, as well as various other permission structures. Note that the policy maps 150 can be updated as well, and so the permission structure(s) and rule(s) therefor can be changed over time.

Each account 130 has an associated cryptographic key 132 that is controlled by the HSM 100. The cryptographic key 132 is used to secure 160 each policy map 150 for each vault 140 in the associated account 130. In some embodiments, the cryptographic key 132 is a symmetric cryptographic key used by the HSM 100 to encrypt 160 each policy map 150, and the HSM 100 authenticates each policy map 150 by decrypting the policy map 150 using the cryptographic key 132. In some embodiments, the cryptographic key 132 is an asymmetric cryptographic key, where the private key portion of the key 132 is used by the HSM 100 to digitally sign 160 each policy map 150 when it is first created (or updated), and the HSM 100 authenticates each policy map 150 by confirming the digital signature of the policy map 150 using the public key portion of the key 132.

Regardless of the type of key 132, the HSM 100 only allows use of a private key 142 in a vault 140 when the requested action conforms to the rules set forth in the vault's associated policy map 150 and only when that policy map 150 has been authenticated by the HSM 100. When both conditions are met, the HSM will effect the requested action. In some cases, effecting the requested action involves digitally signing some data using the private key 142 (e.g., to effect a withdrawal of a cryptoasset). In some cases, effecting the requested action involves using the cryptographic key 132 (e.g., encrypting or digitally signing an updated policy map 150).

In some embodiments, the HSM 100 stores multiple cryptographic keys (e.g., all the cryptographic keys) that are kept secure by the HSM 100. Thus, the HSM 100 can store all the private keys 142 for each of the vaults 140. However, to reduce the amount of storage space required by the HSM 100, in some embodiments, a key derivation function (KDF) is used to derive 165 the private keys 142 on the fly, as they are needed. The KDF is a deterministic algorithm used to generate the private keys 142 in each respective vault 140 from respective unique identifiers for each vault 140. Thus, as shown, a key 142 is derived 165 using a KDF that takes vault ID "A" as input. Note that, regardless of whether or not the private keys 142 are generated only when needed (or stored), the process of using the Vault ID to derive the private keys 142 for each vault 140 forces the logical separation of the vaults 140 and ensures that private keys 142 cannot be shared between vaults 140. In addition, each cryptoasset in a vault can have one or more private keys 142 produced for that cryptoasset.

Moreover, the KDF can also use other information as input to help improve security in the CCS. For example, the KDF can use the cryptographic key 132 and the Asset ID as input, in addition to the Vault ID, as shown in FIG. 1A. Additional or different inputs can also be used with the KDF. Moreover, the HSM 100 and/or other HSMs in the CCS can each use different KDFs to further increase security in the CCS. Examples of KDFs that can be used include HKDF, PBKDF2, and scrypt. In general, a KDF takes input key material (e.g., an Organization key) and one or more deterministic identifiers (e.g., Vault ID and Asset ID). Further, in the case of on-the-fly creation of the private keys 142, as each private key 142 is regenerated for use in effecting an action (e.g., to digitally sign at least a portion of a request to withdraw a cryptoasset), once the action has been effected (e.g., sending resulting digital signature data to a blockchain network, either directly or through an intermediary) the private key 142 is deleted from memory entirely. Thus, the private keys 142 only exist in the HSM 100 for the times in which they are needed.

Further, one or more additional levels of key indirection can be used. For example, the HSM 100 can store its master cryptographic key 122, and when the cryptographic key 132 is first created by the HSM 100, this key 132 can be encrypted using the master key 122. This will allow the cryptographic key 132 to be stored (in encrypted form) in other computers and still remain secure, as the cryptographic key 132 can only be decrypted by the HSM 100 using its master key 122. Note that in some embodiments, the master key 122 is specific to the individual HSM, and in other embodiments, the master key 122 is shared among two or more HSMs (or potentially shared by all the HSMs) in the system to increase HSM availability for processing requests. Further, in some implementations, the cryptographic key 132 is a public-private key pair, only the private key 132 of the pair is encrypted with the master key 122, and the public key 132 of the pair is regenerated on the fly, as needed, from the decrypted private key 132 of the pair. Moreover, in some embodiments, a separate cryptographic key 132 is generated for each vault 140 in each custodial account 130 using the Vault ID to derive each respective cryptographic key 132, which forces the logical separation of the vaults 140 up to the level of the cryptographic key 132, and ensures that cryptographic keys 132 cannot be shared between vaults 140.

Cryptoasset Custodial System (CCS)

Figure 1B:
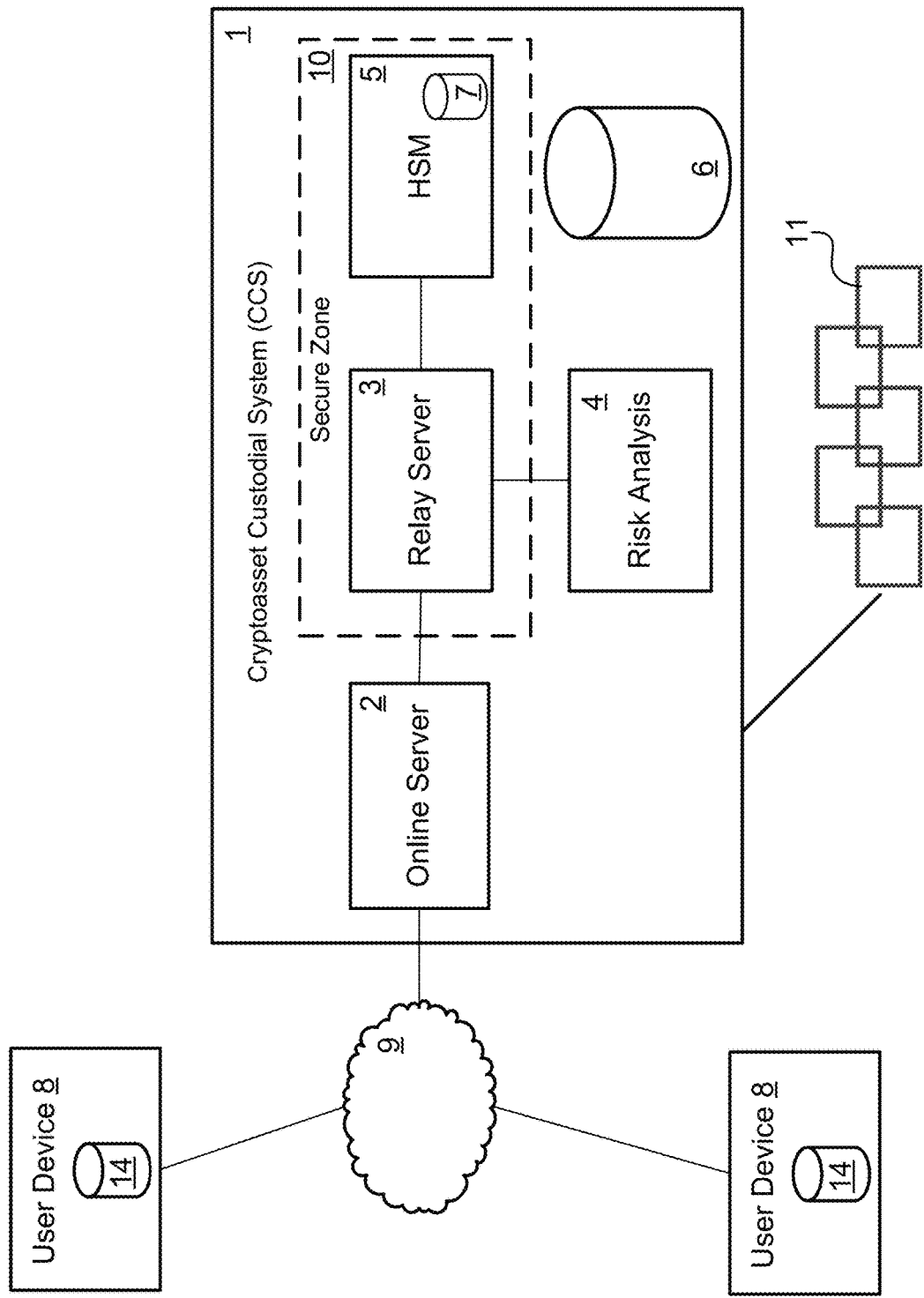
FIG. 1B is a block diagram showing an example of a cryptoasset custodial system (CCS).

As noted above, the HSM 100 can be employed in a larger CCS, which can include additional HSMs and can employ additional systems and techniques to improve security. FIG. 1B shows a block diagram of an example of a CCS. In the shown embodiment, the CCS 1 includes an online server 2, a relay server 3, a risk analysis stage 4, an HSM 5, e.g., implemented as HSM 100, and a data storage facility 6. The data storage facility 6 may include one or more databases, e.g., database 110, which can be or include relational databases or any other type of mechanism for storing data in an organized way, where the data may be structured data and/or unstructured data. The HSM 5 also includes its own internal secure storage facility 7, e.g., secure storage device 106. Note that there can be multiple instances of each of the above-mentioned components in the CCS 1, even though only one of each is shown to simplify description. One or more user devices 8, also called clients, can communicate with the CCS 1 via a public computer network 9, such as the Internet. Each of the user devices may be any one of, for example, a smartphone, tablet computer, laptop computer, desktop computer, or the like. Each user device 8 may include a secure enclave 14, such as an iOS-based secure enclave, which is used to store the corresponding user's private key and to generate digital signatures of that user. In at least some embodiments, each user device 8 is associated with a different user, and this description henceforth assumes such an embodiment to facilitate description. Note, however, that it is possible to have embodiments in which multiple users share the same user device 8.

The relay server 3 functions as a virtual air gap to isolate the HSM 5 from the public computer network 9. The relay server 3 and HSM 5 operate within a secure zone 10. The HSM 5 may physically reside in a physically secured datacenter with no direct access to any outside network. Messages between the HSM 5 and the online server 2 are routed on a half-duplex (outbound request-responses only) connection to the relay server 3 in the secure zone 10. The relay server 3 disconnects itself from the secure network while communicating with the online server 2, and disconnects itself from all external networks while communicating with the HSM 5, such that no interactive sessions with those devices can be established from the outside. This provides virtual "air gap" security to critical infrastructure.

In certain embodiments, the CCS 1 also has access to at least one blockchain network 11 corresponding to cryptoassets of which the CCS 1 has custody. Access to the blockchain network 11 may be via the public computer network 9, e.g., the Internet.

In some embodiments, each transaction submitted by a customer of the CCS 1 will go through the risk analysis stage 4, which may be partially or fully automated. For example, with some embodiments of the CCS 1, a human risk analysis agent may evaluate the output of automated risk analysis software displayed on a risk review dashboard, to make a decision on whether a transaction has been sufficiently authorized to be accepted. The risk analysis agent or the software can follow a policy set on each individual vault and can look at any of various risk signals (e.g., the amount being transacted, how many users have authorized this transaction, the location(s) from which the transaction was requested and approved, the destination address) to compute a final risk score that might lead to the transaction being approved or more information being requested.

Deposits

Figure 2A:
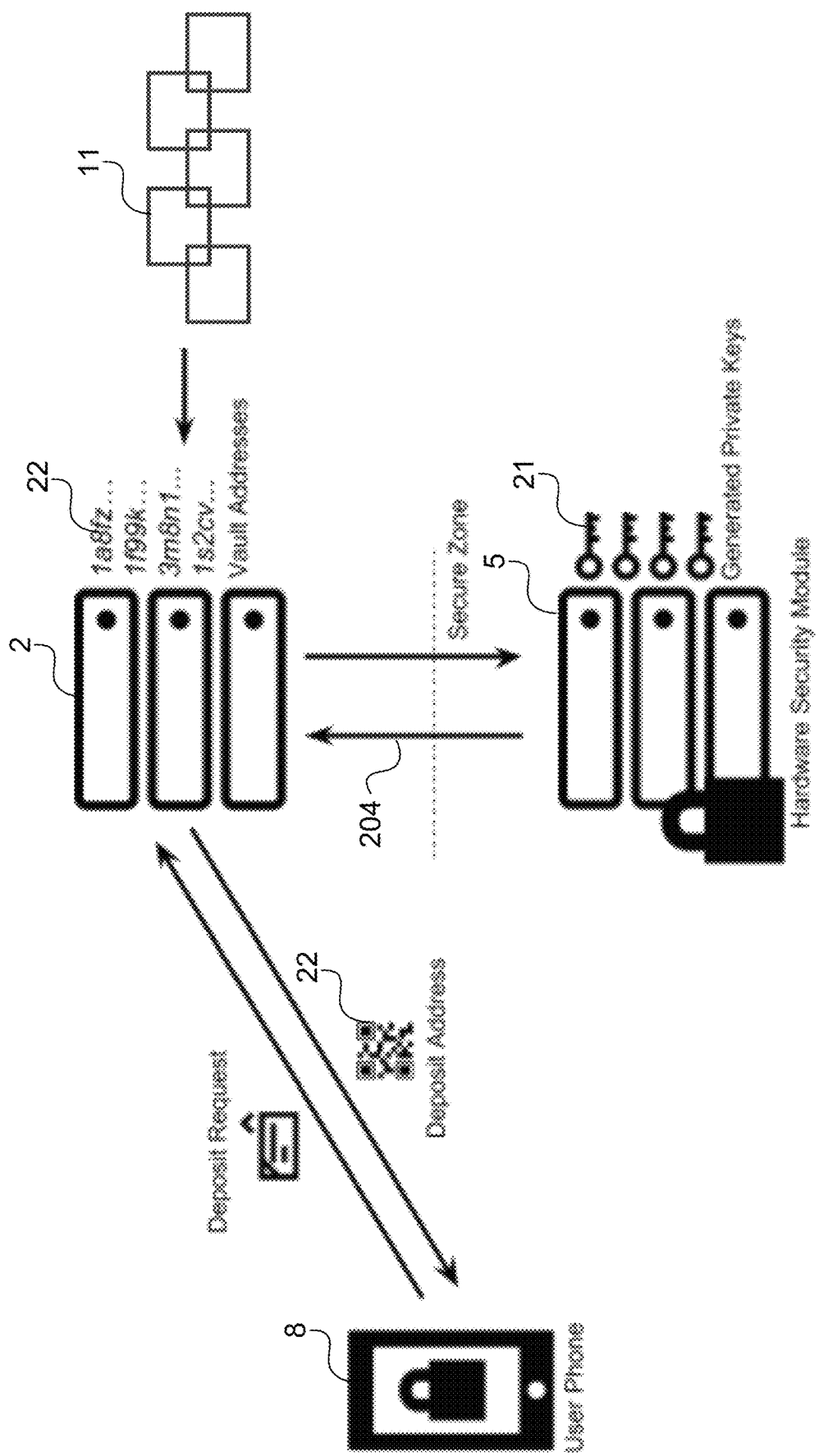
FIG. 2A is a schematic diagram showing an example of a deposit process flow with the CCS.
Figure 2B:
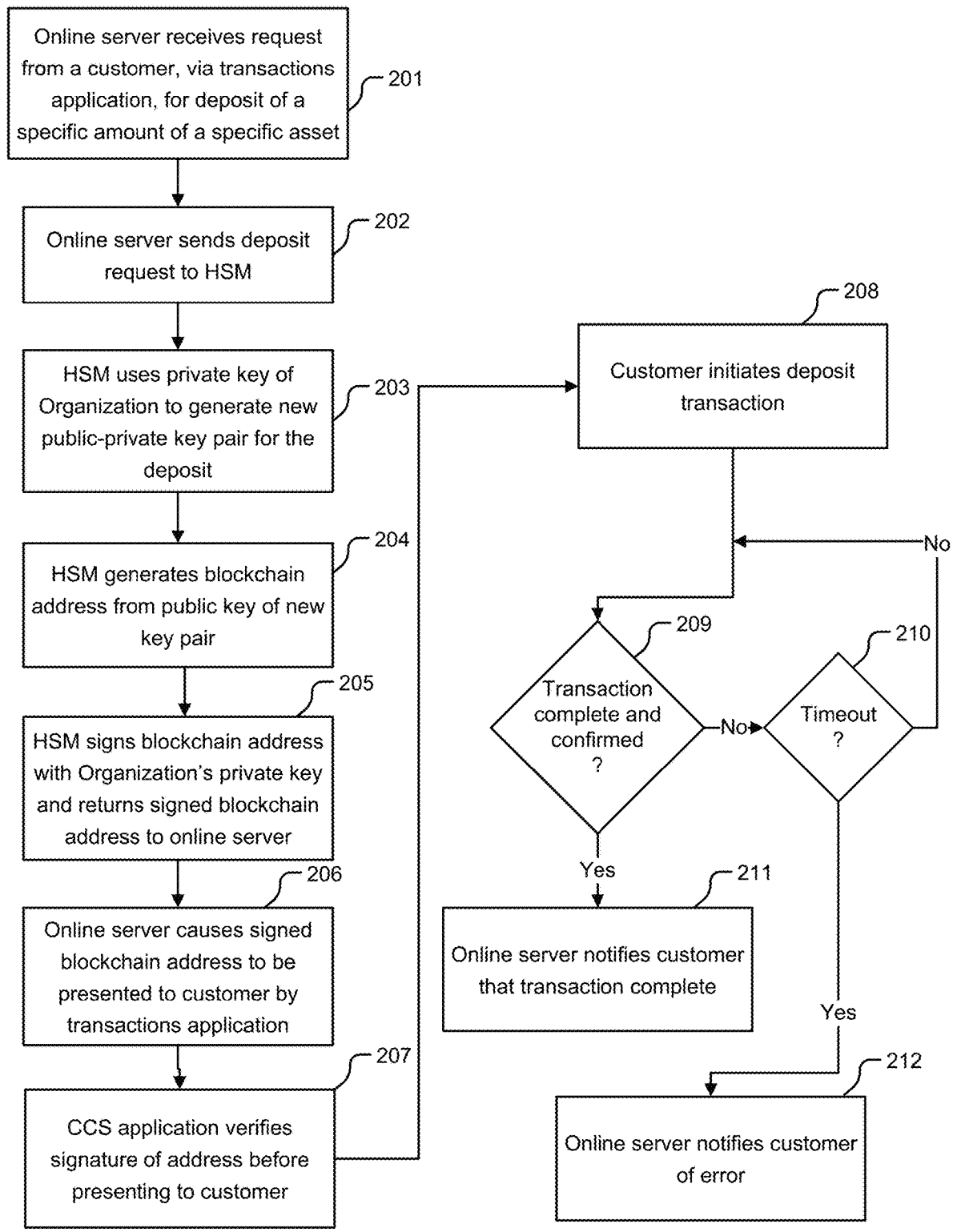
FIG. 2B is a flow diagram showing an example of the deposit process flow.

Refer now to FIGS. 2A and 2B, which show an example of the process of depositing a cryptoasset, such as an amount of cryptocurrencies, with the CCS 1. Deposits are initiated by a customer via the Internet through a software application (hereinafter "the CCS application") (not shown) executing on a user device 8 of the customer. This can be done by the customer's selecting an asset type and requesting a deposit for a given amount in the CCS application. Once initiated, the request for a blockchain deposit address is then sent to the online server 2, which receives 201 the request and forwards 202 it via the relay server 3 to the HSM 5 (which as noted above is isolated from the Internet by the relay server 3). The HSM 5 then generates 203 a new public-private key pair 21 to correspond uniquely with the deposit, i.e., to correspond with the requested blockchain address. In certain embodiments, the HSM 5 uses the private key of the relevant Organization and a KDF to generate the new key pair for the blockchain address. An "Organization" in this context is a data structure that corresponds to a particular customer, as discussed herein. The private key of the newly generated key pair cannot be extracted from the HSM 5, but can be backed up securely in an encrypted file. Key generation inside the HSM 5 ensures that the private keys 21 only exist within the HSM 5, are not available anywhere else in the world and cannot be accessed by any entity that is external to the HSM 5.

The HSM 5 next generates 204 the blockchain address for the deposit from the public key of the newly-created key pair. This can be done by using a well-known blockchain-specific transformation of the public key of the blockchain address. The HSM 5 then signs 205 the blockchain address with the Organization's private key and returns the signed blockchain address to the online server 2. The online server 2 then causes 206 the signed blockchain address 22 to be sent to the customer's user device 8, to cause the user device 8 to present the address to the customer in the CCS application on a user device, in an easy-to-consume format (e.g., as a QR code), for use as a destination address in a blockchain transaction. The CCS application on the user device verifies 207 the signature of the address before presenting the address to customer.

The customer's user device 8 uses the public key of the Organization (which it previously received from the CCS 1 and locally stored) to verify the authenticity of the blockchain address it receives from the CCS 1. The customer then initiates 208 a transaction to deposit assets into the CCS 1. The transaction might be initiated from an exchange, from the customer's personal wallet, or from another cryptoasset store. No confirmation is required for the assets to show up in the CCS 1.

The address of the deposit is stored in a collection with other addresses belonging to the customer in the CCS 1, known as the customer's vault. A vault in this context is a data entity that contains assets and a policy map containing one or more policies governing deposits and withdrawals from those assets. A cryptoasset is represented as a slot inside a vault that can hold an amount of an asset type (e.g., Bitcoin, Ethereum). Once under custody and stored with the CCS 1, an asset is completely under the control of the CCS 1.

The online server 2 determines whether the customer has confirmed the transaction within the defined time period 209, 210. Once the deposit transaction is confirmed by customer and confirmed on the blockchain, the customer is so notified 211 by the online server 2, and the assets are considered to be under custody of the CCS 1. In the event confirmation is not received within the defined time period, the online server notifies 212 the customer of an error in the transaction.

Withdrawals

Figure 3A:
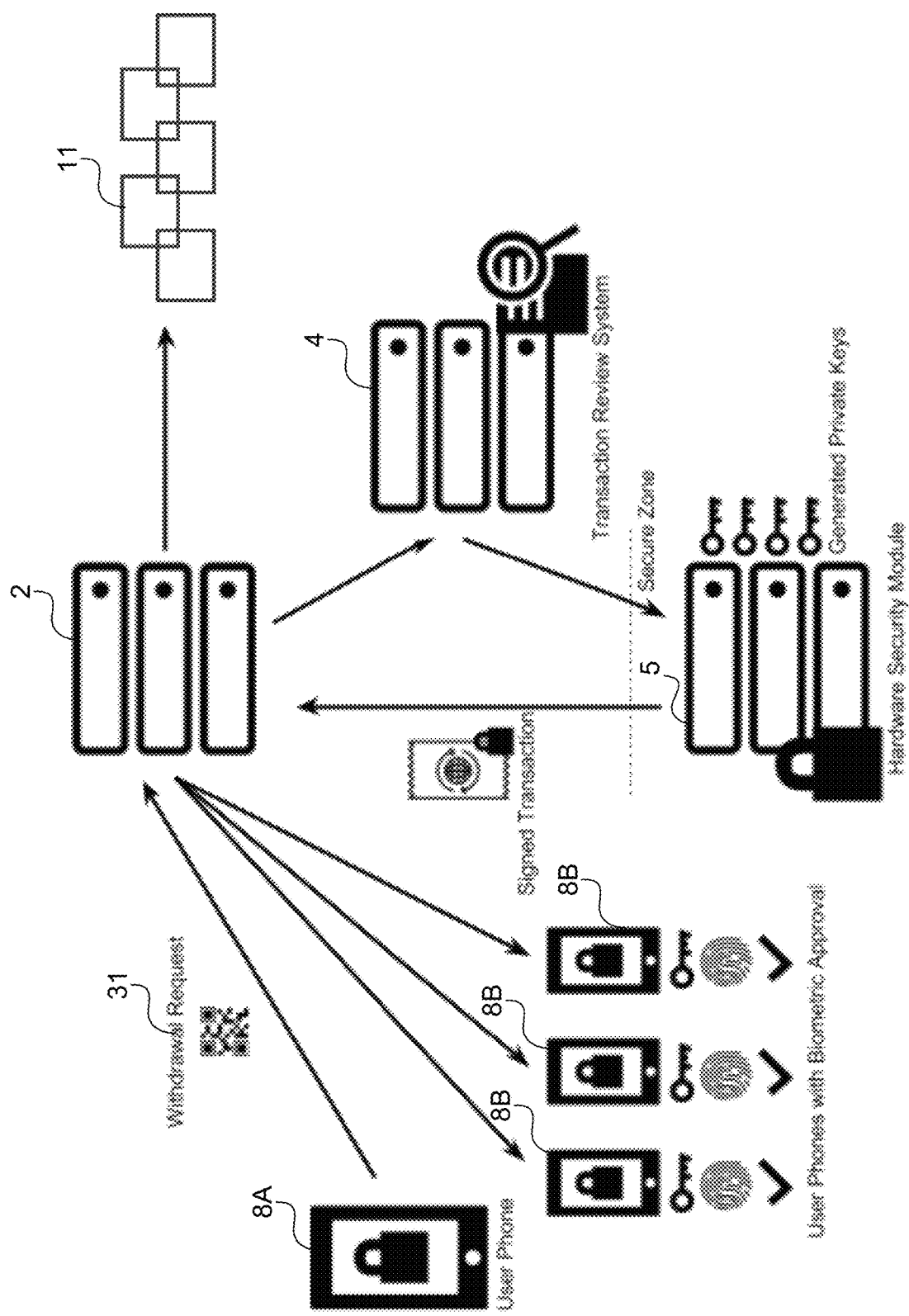
FIG. 3A is a schematic diagram showing an example of a withdrawal process flow with the CCS.
Figure 3B:
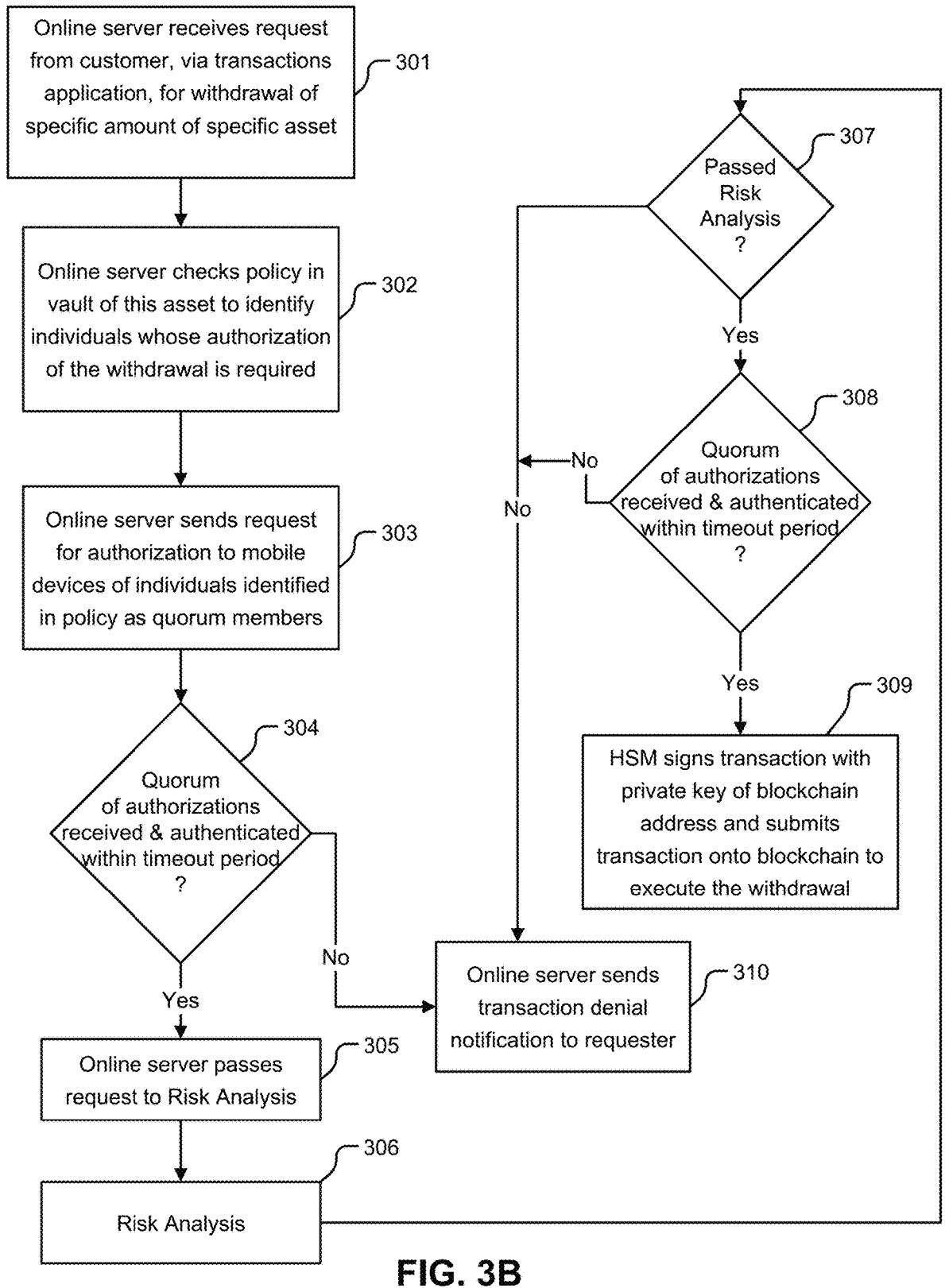
FIG. 3B is a flow diagram showing an example of the withdrawal process flow.

FIGS. 3A and 3B show an example of the process of withdrawing an amount of a previously deposited cryptoasset, such as cryptocurrency. Withdrawals can be initiated from the CCS application on a user device 8A by selecting a specific cryptoasset to withdraw and an amount. Once initiated, all authorizing parties are made aware of the withdrawal request and are required to authorize it individually on their mobile devices 8A and 8B.

During this process users are required to review the transaction and approve it, where each user's approval is subject to biometric authentication (e.g., fingerprint, facial recognition and/or voice recognition). In certain embodiments, before a withdrawal can successfully move on to the next phase, every request is sent to the risk analysis stage to be inspected for suspicious activity and authorized as legitimate. The HSM 5 validates that a defined quorum (e.g., a majority) of users authorized the transaction, and that the transaction was approved by the risk review stage 4. For example, for a given corporate customer that has five distinct employees who require the ability to transfer funds, a suitable quorum configuration might be to have a group of three of those five employees be necessary to move any funds. The HSM 5 then proceeds with the signature and submission of the asset-moving transaction to the blockchain 11.

An example of the withdrawal process is further shown in FIG. 3B. The online server 2 initially receives 301 the withdrawal request 31 from the customer. The online server 2 then checks 302 the approval policy for the cryptoasset that is the subject of the transaction, as indicated in the vault of the cryptoasset, to determine which individuals' authorizations (endorsements) may be used to satisfy a quorum to approve the withdrawal. The online server 2 then sends 303 endorsement requests to the mobile devices 8A, 8B of those individuals (the mobile devices have been previously registered with the CCS 1). In response to these requests, one or more endorsement messages may be received from users' mobile devices 8A, 8B, where the endorsement messages were signed locally by the users' respective private keys stored securely in their respective mobile devices and subjected to one or more biometric authentication techniques, as described further below. Accordingly, the online server 2 determines 304 whether, within a timeout period, a quorum of authorizations have been received and the corresponding authorizing parties have been authenticated, as specified in the policy for this cryptoasset. If so, the online server 2 passes 305 the transaction request 31 to the risk analysis stage 4. Otherwise, the online server sends 310 a transaction denial notification to at least the user who requested the transaction (and possibly to all other users identified in the policy for this cryptoasset).

The risk analysis stage 4 performs a risk analysis 306, which as noted above may be fully or partially automated, or in some embodiments may be performed entirely by one or more human beings (based on computer output data). If the transaction passes risk analysis 306, then control flow is passed to the HSM 5, which verifies 308 that the quorum requirement has been satisfied, by performing the same determination as determination 304 or a similar determination, as does the risk analysis 306 (described further below). If satisfaction of the quorum is verified by the HSM 5, the HSM signs the withdrawal transaction with the private key of the blockchain address and submits the transaction onto the blockchain 11 to execute the withdrawal 309. Otherwise, the HSM 5 signals a failure to the online server 2, which in response sends 310 a transaction denial notification to at least the user who requested the transaction (and possibly to all other users identified in the policy for this cryptoasset).

User Authentication

As mentioned above, when a user endorses a transaction request, they are subjected to one or more forms of authentication by their mobile device and/or the CCS 1, to establish that they are the expected person taking the action. These authentication forms may include one or more biometric authentication techniques, such as fingerprint verification, voiceprint verification, speech recognition, facial recognition and/or gesture recognition. The user's mobile device (e.g., smartphone) may perform one or more of these authentication techniques.

Additionally, or alternatively, the user may be required to upload to the CCS 1 a video, captured by their mobile device, from which their identity can be proven by, for example: identifying the user's face in the video against images of known faces (e.g., previous videos of the user); identifying the user's voice in the video against their trained voice profile; requiring the user to say certain words or take certain actions in the video based on the transaction (see further discussion below); requiring the user to make a previously specified gesture, or a distress gesture if they are in distress; requiring the user to identify on video the expected room they are in; and/or other performing any other actions that are considered to increase the level of confidence that the user is who he or she purports to be.

When determined to be necessary, a user may be asked to complete challenges to authenticate that he or she is in fact the person who is authorized to act on the transaction. These challenges may be generated deterministically based on the context of the transaction. For example, based on critical information in a transaction such as the ID, amount, destination, etc., the CCS 1 may generate a random number that can be used to select a few (e.g., three to five) words from a set of known words. The CCS 1 may present those words to the user and have the user speak them in a video captured by the user's mobile device, which the user's mobile device then transmits to the CCS 1. When reviewing the transaction, the reviewing mechanism or a human reviewer can independently generate the expected words based on transaction data and verify that the user spoke those words. The video can also be subject to facial and/or voice recognition. By performing this type of deterministic challenge generation, an attacker can be prevented from faking a transaction by capturing and reusing previously transmitted authentication videos from the user.

HSM Logic

The main role of the HSM 5 is to verify the validity of operations. The HSM 5 carries out the will of the signers and authenticates that the signers are the authorized parties of an operation through the HSM's privileged access to keys. Keys needed for signing transactions can be stored securely in the HSM 5 and never leave it. In some embodiments, the HSM 5 enforces these policies through a Secure Execution Environment (SEE) that runs code that cannot be changed except through physical access to the HSM 5 and requires a set of smartcards held securely by multiple employees of the Cryptoasset Custodian.

In certain embodiments, to facilitate the above-mentioned functionality the HSM 5 stores, in its internal storage 7 multiple instances of a data structure called "Organization," i.e., one instance for each customer of the Cryptoasset Custodian. The Organization data structure may contain the following fields: an identifier (ID) of the organization, a name of the organization, a public key of the organization, a list of users who belong to the organization, a policy map, a list of vaults that belong to the organization and their respective policy maps, and a generation number that is incremented each time the organization structure is updated. A "policy map" is a set of policies, including one policy for each possible action that may be carried out (e.g., add user, change vault policy, etc.). An Organization is signed by the HSM, using the Organization's private key (which is stored in the HSM 5 and cannot be read by any external entity), to indicate that it was produced through a valid set of changes authorized by the users and risk reviewers. The HSM keeps track of the most recent version to prevent rollback attacks.

To onboard a new customer, the HSM 5 creates a new Organization instance. To help ensure adequate security, the HSM 5 may create the Organization with the requested set of users already in it. In some embodiments, the HSM 5 must generate new unique keys for every new Organization created this way. This prevents an attacker from asking the HSM 5 to generate a "new" organization that has the same ID as an existing one and tricking users into trusting it instead.

Furthermore, as noted above, the HSM 5 can be implemented as HSM 100, or similarly, the HSM 100 can be implemented as HSM 5 in CCS 1. Thus, HSM 5 need not store the private keys 21 in the internal secure storage facility 7, but rather can regenerate the private keys 21, as needed, in certain embodiments. Likewise, the HSM 5 need not store the Organization's private key in the internal secure storage facility 7, but rather can regenerate the Organization's private key, as needed, in certain embodiments. Similarly, the HSM 5 need not store the Organization data structure in the internal secure storage facility 7. In certain embodiments, the Organization data structure is digitally signed by the Organization's private key, which in turn is encrypted using the HSM's master key, and so the encrypted private key of the Organization and the Organization data structure can be stored elsewhere and provided to the HSM when needed for processing by the HSM.

Figure 4:
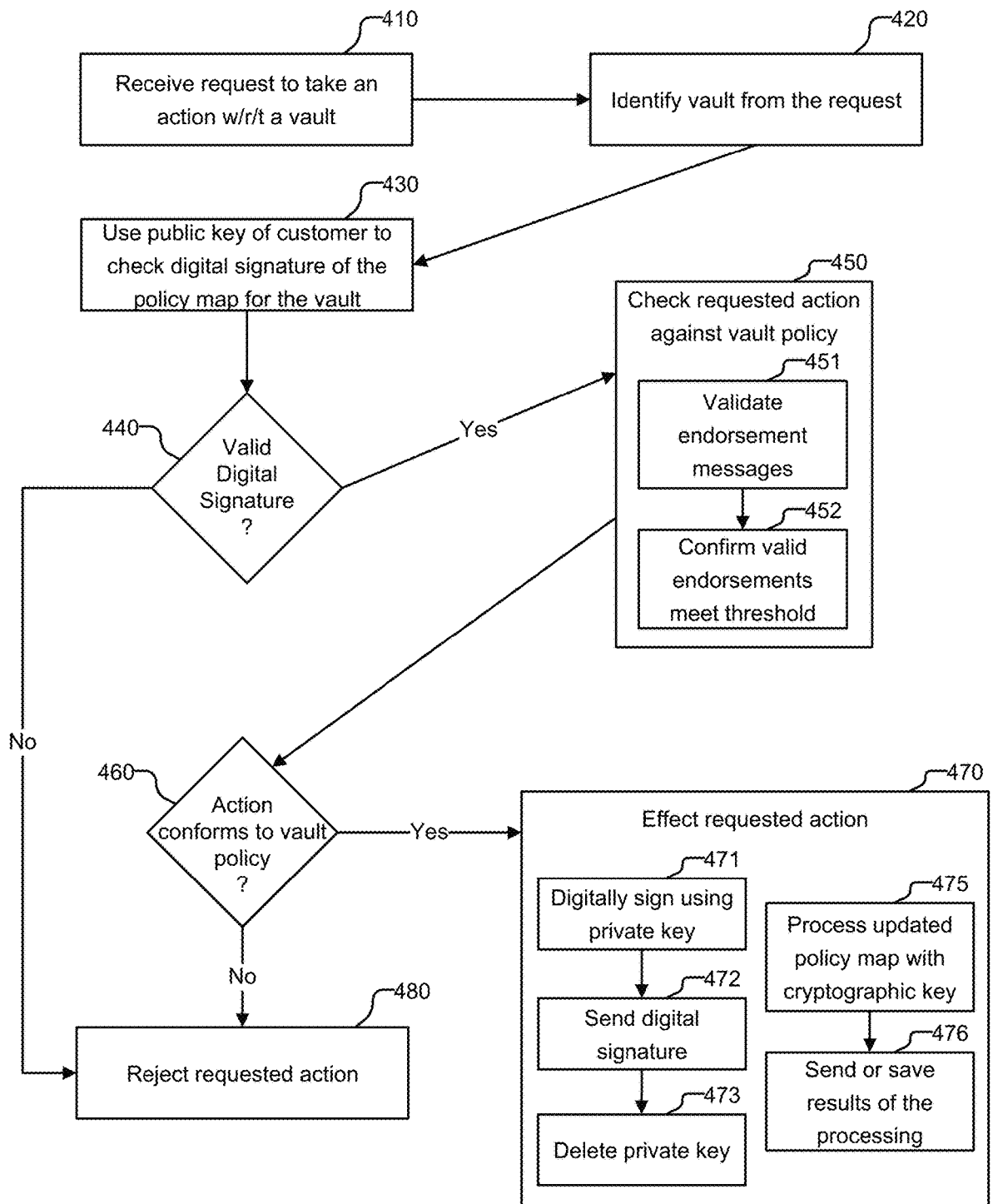
FIG. 4 is a flow diagram showing an example of a process performed by an HSM in connection with a requested operation.

FIG. 4 is a flow diagram showing an example of a process performed by an HSM 5, 100 in connection with a requested operation (also referred to as a requested action). A request is received 410 to take an action with respect to a vault of multiple different vaults in a cryptoasset custodial system. As described above, the multiple different vaults are logical groupings of cryptoassets associated with a user (e.g., a customer and/or customer's employee and/or retail customer) of the cryptoasset custodial system. In some embodiments, the request includes additional information needed by the HSM 5, 100 to process the request, such as a policy map for a vault, e.g., in an Organization data structure. Moreover, various types of requested actions are possible, including deposits, withdrawals, transfers, policy updates, etc. Further, requests to use the key can include details about what exactly is being signed. For instance, for a withdrawal, the system can validate the user signed the destination address, the amount being sent, and the fee being used, as well as the hash of the actual transaction so it can't be replayed. The HSM deserializes the transaction and ensures that all of the user's intended values match what's there.

A vault is identified 420 from the received request. This can involve extracting a Vault ID from the request itself, or determining a Vault ID from other information in the request. For example, the request can include an Asset ID, which the HSM can use to look up the Vault ID in a database. Other information used by the HSM, such as a public key of a customer that owns the vault, can be extracted from the request or be determined or derived from information in the request.

The public key of the customer that owns the vault is used 430 to check a digital signature of a policy map for the vault. The digitally signed policy map can be stored on the HSM, provided to the HSM along with the request, or obtained by the HSM in response to the request. In any case, the digital signature of the policy map is checked before the HSM allows the requested action to proceed with respect to the vault.

If the digital signature is not valid 440, the requested action is rejected 480. If the digital signature is valid 440, the requested action is checked 450 against one or more policies specified by the policy map for the vault. As described above, various rules can be defined by the policy map, including quorum requirements. Thus, in some embodiments, the check 450 includes validating 451 endorsement messages from at least a subset of individual users of the cryptoasset custodial system, as specified by the policy map, and confirming 452 that the number of valid endorsements meets a threshold, as specified by the policy map. Validating 451 the endorsement messages can include checking cryptographic digital signatures using public keys corresponding to the subset of the specified individual users. Further details of examples of such quorum-based policies are described in connection with FIGS. 3A, 3B and 5.

If the requested action does not conform 460 to the rules of the policy map for the vault, the requested action is rejected 480. If the requested action does conform 460 to the rules of the policy map for the vault, the requested action is effected 470 by the HSM. Note that amount of processing 470 performed by the HSM can vary with the action requested and the details of implementation in various embodiments. At a minimum, the HSM will perform at least one cryptographic processing operation and then send and/or save a result of this processing to effect 470 the action.

For example, the HSM can digitally sign 471 some data (e.g., at least a portion of the request) using a private key (e.g., a cryptoasset private key) and then send 472 the digital signature to an appropriate recipient (e.g., to a blockchain network) for further processing. In addition, if the HSM regenerates private keys as needed, the HSM can then delete 473 the private key used in the digital signature process. Note that while a KDF approach to key generation is described, the cryptographic keys can be generated in other manners and stored on the HSM(s). As another example of an action, the HSM can process 475 an updated policy map with a cryptographic key (e.g., encrypt the updated policy map with a symmetric key of the customer, or digitally sign the updated policy map with a private portion of an asymmetric key of the customer) and then send or save 476 the results of this processing. In some embodiments, the HSM also updates the policy map itself based on received instructions, and in some embodiments, the HSM receives the updated policy map along with the request to authorize and secure the update. Other actions, policies, and additional security measures can also be employed.

Figure 5:
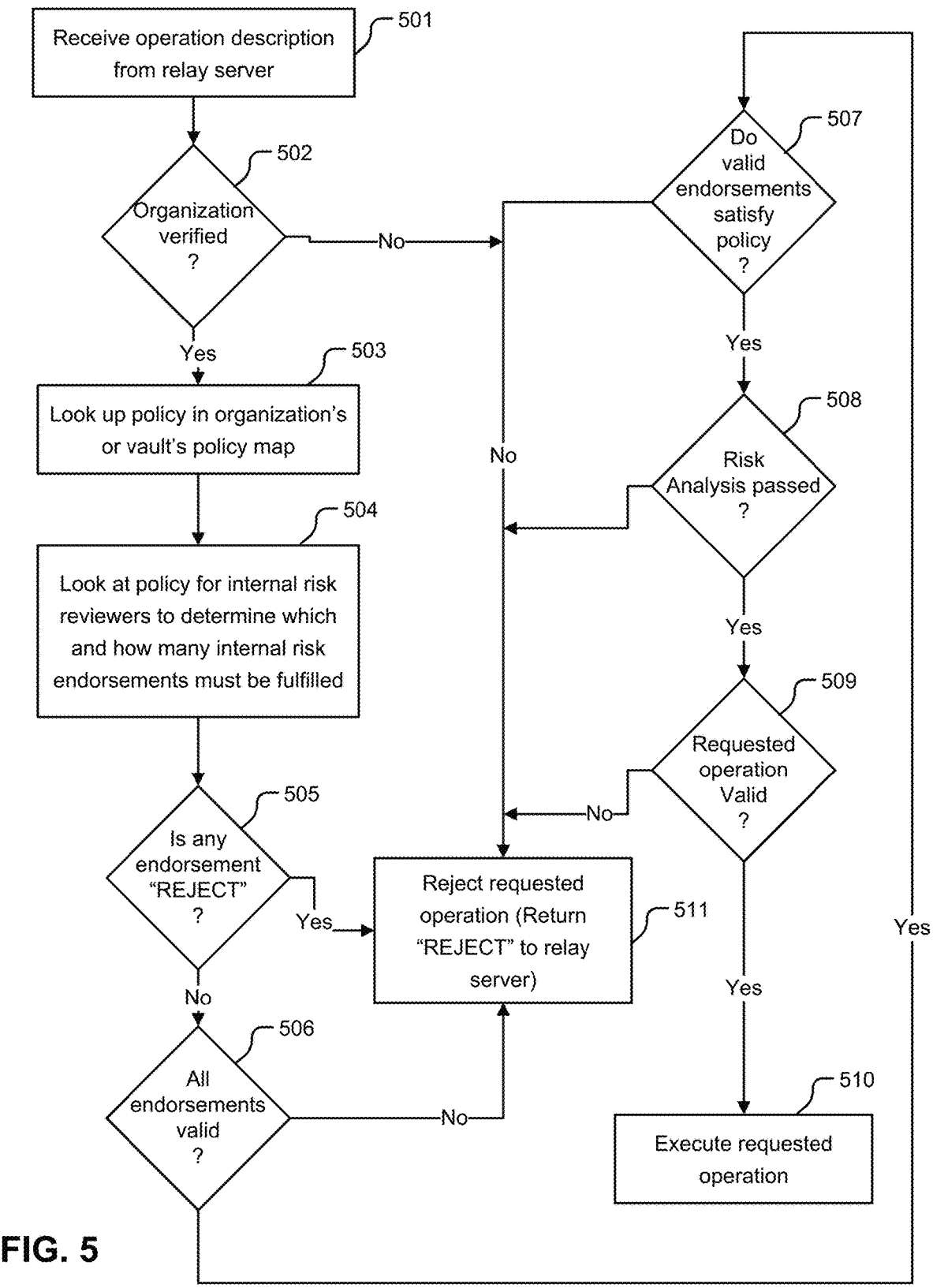
FIG. 5 is a flow diagram showing an example of another process performed by an HSM in connection with a requested operation.

FIG. 5 shows an example of a process that may be performed by the HSM 5, in at least some embodiments, in response to a request to carry out an operation. The request may be received by the HSM 5 from the relay server 3. Initially, the HSM 5 receives 501 from the relay server 3 an operation description, which specifies an Organization. The operation description is a set of data and metadata describing a requested operation, such as a requested deposit, withdrawal or transfer of cryptocurrency. The HSM 5 then verifies 502 the integrity of the specified Organization.

The HSM 5 then looks up 503 the policy in the Organization's or the vault's policy map. It then looks at the policy for internal risk reviewers to determine 504 which and how many internal risk endorsements (i.e., endorsements by personnel of the Cryptoasset Custodian) must be fulfilled. Next, the HSM 5 determines 505 whether any of the received endorsements (from users) indicates to "REJECT"

the requested operation. If so, the HSM 5 rejects 511 the requested operation, by returning a "REJECT" message to the relay server, which then returns a corresponding "REJECT" message to the online server, to cause notification to the requester. In this case, the HSM 5 does not bother checking the signatures and just rejects the operation.

The HSM 5 then determines 506 whether all of the received endorsements for the transaction are valid. This includes verifying the validity of the endorsements provided by checking that: i) the user is in the Organization, ii) the signature is correct for the specified operation, and iii) each of the signatures has an "APPROVE" decision. If not all of the received endorsements for the transaction are valid, the process proceeds to rejection 511 as described above.

If all received endorsements for the transaction are valid, the HSM 5 then determines 507 whether the endorsements satisfy the relevant policy for the subject cryptoasset (i.e., satisfy the specified quorum). If the valid endorsements do not satisfy the policy, the process proceeds to rejection 511 as described above. If the endorsements satisfy the policy, then the HSM 5 determines 508 whether the requested operation passed the risk analysis stage. If not, the process proceeds to rejection 511 as described above. If the requested operation passed the risk analysis stage, the HSM 5 determines 509 whether the requested operation is valid. This can include verifying that the operation is internally consistent and that the operation can be applied to the Organization, vault or asset that it targets. If the requested operation is not valid, the process proceeds to rejection 511 as described above. Otherwise, the HSM 5 executes 510 the requested operation (or triggers an action to cause it to be executed). An operation to change the Organization, vault or policy results in a new signed Organization data structure with a higher generation value and the change applied to it. An operation to withdraw assets results in the HSM 5 signing a blockchain transaction with the private key corresponding to the subject asset. An operation to deposit assets results in the HSM 5 generating a deposit address.

Offline Device Endorsements

As a method for reducing the risk for users interacting with the CCS application on their personal devices, the CCS 1 may require authorization from an offline device. This device, such as a consumer phone with secure enclave or similarly capable computing device such as an iPod Touch, will be completely disconnected from the Internet in its normal state, and used in an offline manner to sign transactions required for authorization.

The process may be carried out as follows. The user has a phone or similar device that is a member of his or her vault policy's quorum and is not connected to any wireless or cellular networks. The device runs software similar to the CCS application software for enabling a user to endorse requested transactions, or the same software operating in a different mode. The user initiates a transaction against his or her vault through a different device in the quorum. An online device, such as another phone or web browser, has access to the transaction. It may be another phone/secure device in the quorum or it may exist solely for the purpose of displaying transactions. The device has the ability to transmit data that is required to be signed by the offline device, to the offline device. This can be done through a channel that cannot be accessed over the Internet, such as displaying a QR code, playing a sound or sequence of sounds that encodes data, or transmitting over Bluetooth. The offline device displays the data that was transmitted for it to sign, for the user's approval or rejection. The offline device signs its endorsement of the operation based on the user's desired action. The offline device communicates its signed payload back to the online device in a similar manner to how it was received (e.g., displaying a QR code, playing a sound or sequence of sounds that encodes data, or transmitting over Bluetooth). The online device communicates the signed decision payload back to the online server of the CCS 1.

Figure 6:
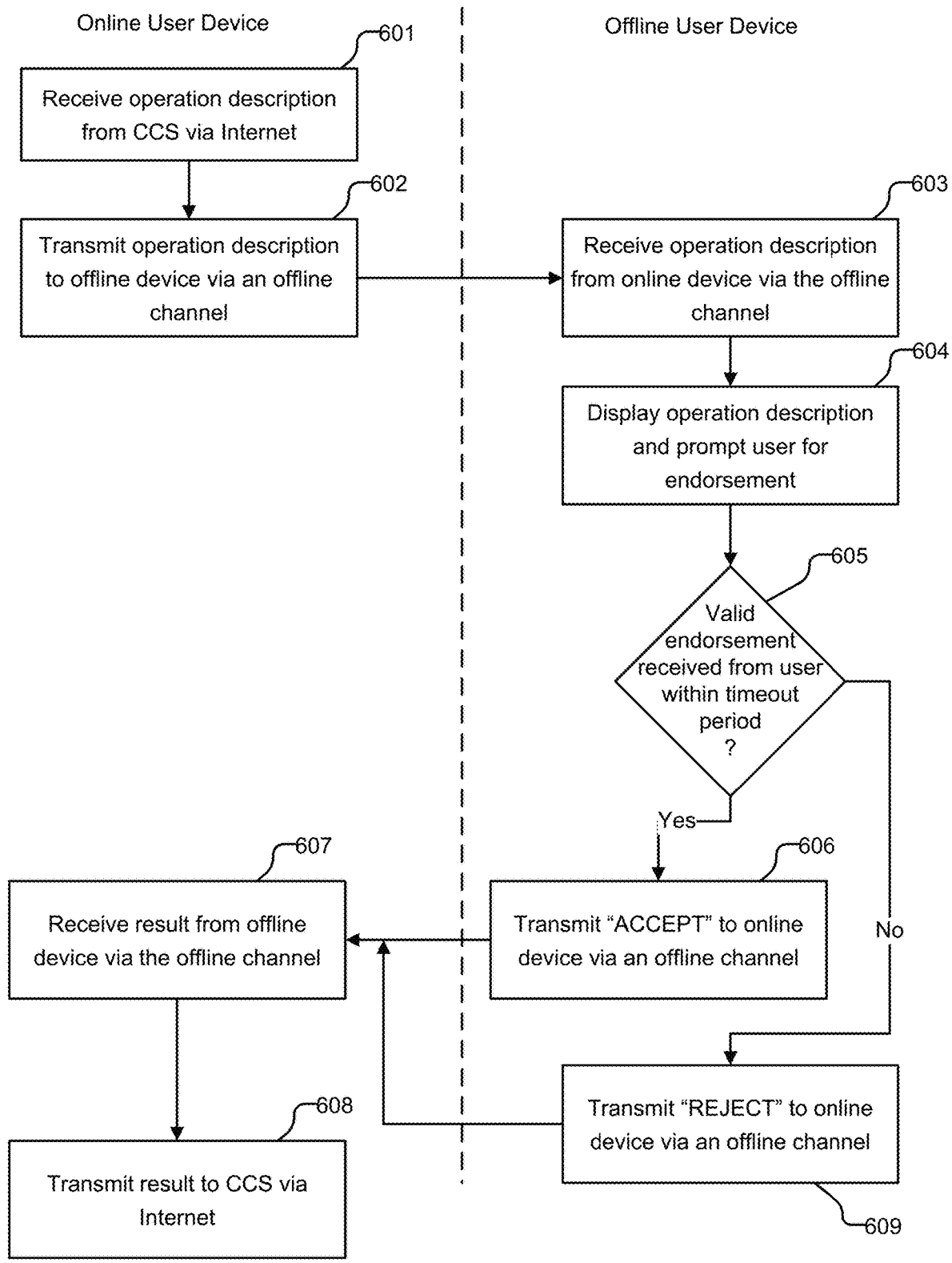
FIG. 6 is a flow diagram showing an example of a process for using an offline user device to endorse a requested transaction.

FIG. 6 is a flow diagram that further shows this process, according to certain embodiments. An online user device receives 601 an operation description from the CCS via the Internet. The online user device then transmits 602 the operation description (or a portion thereof) to the offline user device file an offline channel. As noted above, the offline channel is a channel that is not accessible via the Internet, such as a local visual display by the online user device, a sound or sequence of sounds generated by the online user device, or a short range wireless transmission from the online user device (e.g., via Bluetooth). The offline user device receives 603 the operation description from the online user device via the offline channel, and based on the information thereby received, displays the operation description (or portion thereof) and prompts 604 the user for endorsement of the operation. If a valid endorsement is received 605 by the offline device as user input within a timeout period, the offline device transmits 606 an "ACCEPT" message to the online user device via the same offline channel by which it received the operation description, or via a different offline channel. The online user device then receives 607 the results of the endorsement from the offline device and transmits 608 the result payload to the CCS via the Internet. If a valid endorsement is not received 605 by the offline user device from the user within the timeout period, the offline user device transmits a "REJECT" message to the online user device via the offline channel, which in turn transmits 609 the "REJECT" payload to the CCS via the Internet.

The offline device may be delivered to the user with its secure key pre-enrolled in the Organization, or it may be allowed to be online for the initial enrollment process, or it may send its enrollment through a similar procedure to the authorization process.

The CCS software on the offline device may need to be updated periodically. To allow such updates, the offline device may be scheduled to connect to the Internet via Wi-Fi and have its software updated at a predefined cadence, or it may detect that its software needs to be updated as a result of receiving a transaction to sign from the online user device, that indicates that the version of the software on the offline device is no longer compatible. Whenever the device is online, it can record as well as attempt to transmit to the CCS 1 the fact that it can access the Internet so that that information may be used to assess risk by the platform at a later time.

In addition to being kept offline, the offline user device and one or more online devices may be restricted to act on a transaction only when in range of a predefined beacon. A wireless (e.g., Bluetooth) beacon device can be made available to the user, and the CCS application may refuse to authorize transactions unless it detects that the beacon is available.

Auditability and Proof of Ownership

Every transaction submitted to the CCS 1 is recorded in an internal ledger that is tamper-resistant and that allows auditors to have cryptographic proof of every historical event on every user's account. The ownership of a blockchain asset is controlled by the possession of the private key corresponding to the public wallet address. The CCS can prove ownership of these assets to auditors by making use of the private key corresponding to a user's vault to sign a string of randomly chosen text chosen by the auditors. Consider the following example:

An auditor wishes to see proof that the CCS has access to funds in wallet identified by the address, "1BvBMSEYstn5Au4m4GFg7yJaNVN2." The auditor therefore randomly generates a long string, e.g., "xGG8vQFnd8QDwHz6Uj1GX," and submits the following challenge:

```
{
    Address: 1BvBMSEYstn5Au4m4GFg7yJaNVN2 ,
    Token: " AUDIT-CHALLENGE- xGG8vQFnd8QDwHz6Uj1GX",
}
```

The CCS 1 receives the challenge and forwards it to the HSM 5 as a predefined template serialized package. The HSM 5 is programmed to accept and sign such audit requests (which are not arbitrary payloads and therefore are not at risk of being later interpreted as a signed blockchain transaction) with the private key associated with the specified address. The CCS 1 then returns the valid signature for the challenge that can be independently verified by the auditor. This verification proves that the CCS 1 has control over a private key associated with an entry on the blockchain, achieving proof of control of the asset.

Thresholding Service

In certain embodiments, the CCS 1 includes a Thresholding Service that enables other parts of the system (Risk Analysis stage 4 and HSM 5) to securely determine that user operations and transactions have followed the customer specific business logic and have been approved by a human/automated risk review system. The Thresholding Service can verify multi-signature (multi-user) quorums to achieve this.

The Thresholding Service validates operations initiated and approved by users to ensure that they've met a threshold quorum before being executed. Such operations may include transactions, adding or removing other users, etc. Different users can have different access control roles (e.g., view-only, initiate-transaction-only, authorizable, necessary). The CCS 1 is able to notify every reportable status of the quorum acceptance lifecycle, but is not able to sign-off on operations that have not been authorized by customers. All actions are logged in an append-only ledger for auditability over all account interactions.

One function of the Thresholding Service is to verify that a quorum of authorized users have signed-off on a requested operation. Qualifying operations that may require a quorum may include, for example, proposing a transaction (e.g., "withdraw 100 Bitcoin"), adding a user to an account, changing a user's permissions, removing a user from an account, and changing the thresholding logic. A quorum may be defined as an absolute majority of users by default (e.g., 3 out of 5), or it may be set to a custom quorum upon onboarding of the customer. Moreover, an authorized user can configure a quorum to require certain specific users to endorse a transaction to constitute a quorum. The CCS 1 may also allow thresholding across multiple required groups. For example, in a company a majority of the finance team may be required to sign off, as well as the front office.

In certain embodiments, the Thresholding Service implements a fine-grained access control model in its quorum verification, in which different users can have different access levels, which may include the following levels, for example:

View-only
   This is the default access level
   Users in this level can view all asset positions
   Users in this level can flag any transaction
   Users in this level can freeze all assets View-authorize
   Users in this level can act as an authorizing vote for an action toward a quorum
   Users in this level can view all asset positions
   Users in this level can flag any transaction
   Users in this level can freeze all assets View-authorize-necessary
   Users in this level are a required vote for an action
   Users in this level can view all asset positions
   Users in this level can flag any transaction
   Users in this level can freeze all assets In certain embodiments, the access level for a user can only be changed with an appropriately verified quorum that is verified by the Thresholding Service.

As noted above, user approvals for an action can be expressed by a cryptographic digital signature, to benefit from non-repudiation guarantees. The Cryptoasset Custodian can be certain that the associated user who holds the private key was indeed the user who approved the action, since digital signatures cannot be forged. In certain embodiments, a user's signature is generated from an iOS secure enclave in the user's mobile device, and forwarded to the CCS 1 by the iOS application programming interface (API) component in the user device 8. Signatures can be performed over the cryptographic hash of the transaction contents to ensure that the transaction cannot be tampered with. All users may be required to sign the same hash for the same transaction identifier (ID) in order for the signatures to count toward the quorum. The Thresholding Service can provide templates for the clients to sign, and can verify all completed signatures completed by the iOS client. In at least some embodiments, the Thresholding Service verifies signatures with the public components of the users' signing keys, but does not hold the private components of those user signing keys.

Once a threshold has been satisfied, the Thresholding Service will publish the corresponding signature data to the Risk Analysis stage to be further analyzed before sign-off by the Risk Analysis stage, and will serialize the signature data into a payload to be consumed by the HSM signing service. Each additional signature provided to the Thresholding Service and verification can be recorded in the append-only log service. This will provide additional auditing and status updates in addition to the metadata captured in the Thresholding Service's storage, which will be essential for providing consumable updates to user clients.

Maintaining Quorum Liveness

It is assumed that authorized members of a quorum are available to cryptographically sign transactions. Therefore, the quorum should be kept "live"—that is, at any given time, the CCS 1 has reasonable confidence that all potential members of the quorum maintain possession of their secure device keys and can actively participate in a transaction. In certain embodiments, the CCS 1 can do the following to achieve this level of confidence:

1. Have access to the set of user public keys required to fulfill a policy's quorums.
2. Set a liveness threshold for a policy, i.e., the amount of time after which one considers a key to be at risk of unavailability. This can be fixed or related to normal transaction cadence.

3. Require users to periodically sign a proof transaction with their private keys. This can be explicit as a liveness check or hidden/implicit by requiring their key for routine operations such as login.
4. Record the latest live time of any one or more users' keys.
5. Continuously monitor whether any user's live time has exceeded the liveness threshold.
6. Use the above information to prompt the user to prove they still have access to their signing key and/or inform other users that the quorum may be at risk.

Risk Analysis Stage

The Risk Analysis stage 4 can implement an API, called the Risk API, and can further include human review of all transactions and administrative user operations. In some embodiments the Risk API drives the human review system. The Risk API can provide integration with an internal risk dashboard, for human employees of the Cryptoasset Custodian to manually review each transaction.

In certain embodiments, all transactions are manually approved by designated employee(s); all administrative user operations (adding, removing, permission changes) are manually approved by designated Cryptoasset Custodian employee(s); reviewable entities must have passed an automated verification process before requiring risk analysis; reviewable entities must provide robust context about the user approvals, for both human and further automated inspection; and risk approvals and denials are logged in an append-only ledger for auditability.

The Risk API reverifies the appropriate threshold as determined by the Thresholding Service. The Risk API may also handle additional business logic, such as in embodiments where the Thresholding Service is simplified: for example, the Risk API could check for necessary signers if the Thresholding Service only checks for quorums. Other functions described herein can also be moved between modules.

The Risk API can receive contextual data about each user involved in a transaction, to present to a human and/or classification system. This information may include, for example, user(s) who approved the transaction, time of approval(s), location of approval(s), and device/key ID(s) that approved the transaction. This data can be fed into an internal Risk Analysis dashboard, and possibly other automated review systems.

In some embodiments, the Risk API requires human approval from one or more employees of the Cryptoasset Custodian if a transaction passes the manual and automated risk review. To approve, an employee may be required to sign with a cryptographic key if he or she approves the transaction/operation and present the signature to the Risk API for validation. Moreover, there are preferably multiple keys, one per risk reviewer, such that it is logged who performed the review. Preferably it is made easy to rotate a risk-approval key in case of compromise.

Examples of Physical Computing Environments

Figure 7:
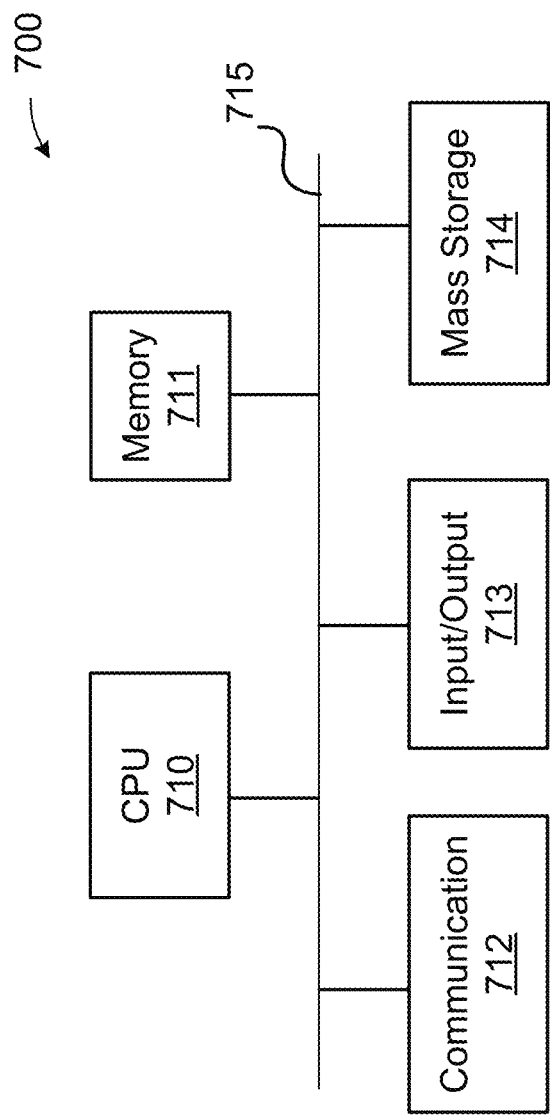
FIG. 7 is a block diagram showing an example of a hardware architecture of a processing system that can be used to implement some or all of the CCS or a user device.

FIG. 7 shows an example of a hardware architecture of a processing system that can be used to implement some or all of the CCS, or (separately) any user device, or both. The CCS can include one or more instances of an architecture such as shown in FIG. 7, where multiple such instances can be coupled to each other via one or more private networks.

The shown processing system 700 includes one or more processors, including a CPU 710, one or more memories 711 (at least a portion of which may be used as working memory, e.g., random access memory (RAM)), one or more data communication device(s) 712, one or more input/output (I/O) devices 713, and one or more mass storage devices 714, all coupled to each other through an interconnect 715. The interconnect 715 may be or include one or more conductive traces, buses, point-to-point connections, controllers, adapters and/or other conventional connection devices. Each processor 710 controls part of the operation of the processing device 700 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 711 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 714 can be or include one or more hard drives, digital versatile disks (DVDs), flash memories, or the like. Each memory 711 and/or mass storage 714 can store (individually or collectively) data and instructions that configure the processor(s) 710 to execute operations to implement the techniques described above. Each communication device 712 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 700, each I/O device 713 can be or include a device such as a display (which may include a transparent AR display surface), audio speaker, keyboard, mouse or other pointing device, microphone, camera, etc. Note, however, that such I/O devices may be unnecessary if the processing device 700 is embodied solely as a server computer.

In the case of a user device, a communication device 712 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 712 can be or include, for example, any of the aforementioned types of communication devices, a wired Ethernet adapter, cable modem, DSL modem, or the like, or a combination of such devices.

Unless contrary to physical possibility, it is envisioned that (i) the methods/operations described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose ("hardwired") circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., RAM or ROM; magnetic disk storage media; optical storage media; flash memory devices; etc.), etc.

The term "logic", as used herein, means: i) special-purpose hardwired circuitry, such as one or more application-specific integrated circuits (ASICs), programmable logic devices (PLDs), field programmable gate arrays (FPGAs), or other similar device(s); ii) programmable circuitry programmed with software and/or firmware, such as one or more programmed general-purpose microprocessors, digital signal processors (DSPs) and/or microcontrollers, system-on-a-chip systems (SOCs), or other similar device(s); or iii) a combination of the forms mentioned in i) and ii).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/operations described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
signing, by a hardware security module, policy maps for respective different vaults in a cryptoasset custodial system using a private key of an asymmetric cryptographic key pair of a custodial account;
receiving, by the hardware security module, a request to take an action with respect to a vault of the different vaults in the cryptoasset custodial system, wherein the different vaults are logical groupings of cryptoassets associated with the custodial account of the cryptoasset custodial system, each of the different vaults has an associated policy map that defines vault control rules governing which actions are allowed for the vault under one or more specified conditions;
determining, by the hardware security module, a vault identifier of the vault based on the request;
authenticating, by the hardware security module, a policy map for the vault on which the action is requested by validating a digital signature of the policy map using a public key of the asymmetric cryptographic key pair controlled by the hardware security module based on determining the vault identifier of the vault, wherein the hardware security module comprises at least one secure storage device and at least one physical computing device coupled with the at least one secure storage device, the at least one physical computing device being configured to provide cryptographic processing to manage, for the custodial account, private keys of asymmetric cryptographic key pairs usable to control access to the cryptoassets in at least one blockchain;
checking, by the hardware security module, the action against the policy map for the vault when the policy map for the vault is authenticated using the asymmetric cryptographic key pair controlled by the hardware security module;
deriving, by the hardware security module, a private key for the vault of the custodial account by applying a key derivation function to the vault identifier of the vault of the custodial account, thereby enforcing the logical groupings of the different vaults of the custodial account;
effecting, by the hardware security module, the action using a derived private key for the vault when the action is confirmed to be in accordance with the policy map for the vault;
regenerating, by the hardware security module, the private key for the one of the cryptoassets by applying the key derivation function to one or more of a unique identifier for the vault, an asset identifier for the one of the cryptoassets, or a cryptographic key associated with the custodial account;
digitally signing, by the hardware security module, at least a portion of the request using the private key for the one of the cryptoassets; and
sending resulting digital signature data to the at least one blockchain.

2. The method of claim 1, wherein the vault control rules of the policy map for the vault specify, for the action, individual users of the cryptoasset custodial system and a threshold number of the individual users to approve the action, and checking the action against the policy map for the vault comprises:
validating endorsement messages from at least a subset of the specified individual users of the cryptoasset custodial system; and
confirming the action is in accordance with the vault control rules of the policy map when the endorsement messages have been validated for the threshold number of the specified individual users.

3. The method of claim 2, wherein validating the endorsement messages comprises checking cryptographic digital signatures using public keys corresponding to the subset of the specified individual users.

4. The method of claim 2, wherein the action comprises changing the policy map for the vault, and effecting the action comprises:
processing an updated version of the policy map using the asymmetric cryptographic key pair controlled by the hardware security module; and
sending or saving results of the processing for future use by the hardware security module.

5. The method of claim 4, wherein processing the updated version of the policy map comprises digitally signing, in the hardware security module, the updated version of the policy map using the private key of the asymmetric cryptographic key pair.

6. The method of claim 1, further comprising: deleting, by the hardware security module, the private key for the one of the cryptoassets from memory in the hardware security module.

7. A non-transitory computer-readable medium encoding a computer program that, when executed by at least one physical computing device of a hardware security module, further comprising at least one secure storage device, causes the at least one physical computing device of the hardware security module to perform operations comprising:

signing policy maps for respective different vaults in a cryptoasset custodial system using a private key of an asymmetric cryptographic key pair of a custodial account;

receiving a request to take an action with respect to a vault of the different vaults in the cryptoasset custodial system, wherein the different vaults are logical groupings of cryptoassets associated with the custodial account of the cryptoasset custodial system, each of the different vaults has an associated policy map that defines vault control rules governing which actions are allowed for the vault under one or more specified conditions;

determining a vault identifier of the vault based on the request;

authenticating a policy map for the vault on which the action is requested by validating a digital signature of the policy map using a public key of the asymmetric cryptographic key pair controlled by the hardware security module based on determining the vault identifier of the vault, wherein the at least one physical computing device is further configured to provide cryptographic processing to manage, for the custodial account, private keys of asymmetric cryptographic key pairs usable to control access to the cryptoassets in at least one blockchain;

checking the action against the policy map for the vault when the policy map for the vault is authenticated using the asymmetric cryptographic key pair controlled by the hardware security module;

deriving a private key for the vault of the custodial account by applying a key derivation function to the vault identifier of the vault of the custodial account, thereby enforcing the logical groupings of the different vaults of the custodial account;

effecting the action using a derived private key for the vault when the action is confirmed to be in accordance with the policy map for the vault;

regenerating the derived private key for the one of the cryptoassets by applying the key derivation function to one or more of a unique identifier for the vault, an asset identifier for the one of the cryptoassets, or a cryptographic key associated with the custodial account;

digitally signing at least a portion of the request using the derived private key for the one of the cryptoassets; and sending resulting digital signature data to the at least one blockchain.

8. The non-transitory computer-readable medium of claim 7, wherein the vault control rules of the policy map for the vault specify, for the action, individual users of the cryptoasset custodial system and a threshold number of the individual users to approve the action, and checking the action against the policy map for the vault comprises:

validating endorsement messages from at least a subset of the specified individual users of the cryptoasset custodial system; and confirming the action is in accordance with the vault control rules of the policy map when the endorsement messages have been validated for the threshold number of the specified individual users.

9. The non-transitory computer-readable medium of claim 7, wherein the operations further comprise:

deleting the derived private key for the one of the cryptoassets from memory in the hardware security module.

* * * * *